(12) United States Patent
Reiner et al.

(10) Patent No.: US 6,502,055 B1
(45) Date of Patent: Dec. 31, 2002

(54) METHOD AND APPARATUS FOR DETERMINING THE GEOGRAPHIC HEADING OF A BODY

(75) Inventors: Jacob Reiner, Doar-Na Misgav (IL); Michael Naroditsky, Carmiel (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 0 days.

(21) Appl. No.: 09/549,600

(22) Filed: Apr. 14, 2000

(30) Foreign Application Priority Data

Apr. 28, 1999 (IL) ................................................ 129654

(51) Int. Cl.⁷ .......................... G06F 15/00; G06F 19/00
(52) U.S. Cl. ....................... 702/150; 701/200; 702/141; 73/504.02
(58) Field of Search ............................. 702/92, 93, 141, 702/150; 73/488, 504.02; 701/200, 224

(56) References Cited

U.S. PATENT DOCUMENTS

| | | | | |
|---|---|---|---|---|
| 4,622,646 A | * | 11/1986 | Waller et al. | 33/326 |
| 5,703,293 A | * | 12/1997 | Zabler et al. | 73/504.02 |
| 6,023,664 A | * | 2/2000 | Bennet | 701/45 |

OTHER PUBLICATIONS

Sun et al., "Accelerometer Based North Finding System", IEEE, Mar. 13–16, 2000.*

* cited by examiner

*Primary Examiner*—Patrick Assouad
(74) *Attorney, Agent, or Firm*—Mark M. Friedman

(57) ABSTRACT

A method of determining an orientation of a body. The method includes the steps of measuring an acceleration of the body in a first direction, measuring an acceleration of the body in a second direction different from the first direction, the first direction and the second direction defining a plane. Measuring an acceleration perpendicular to the plane in a coordinate system rotating about an axis perpendicular to the plane, and inferring the orientation of the body from the three measurements.

25 Claims, 2 Drawing Sheets

METHOD AND APPARATUS FOR DETERMINING THE GEOGRAPHIC HEADING OF A BODY

FIELD AND BACKGROUND OF THE INVENTION

The present invention relates to direction finding and, more particularly, to a method and apparatus for determining the orientation of a body, such as a vehicle or a theodolite, relative to a local geographic coordinate system.

Many methods and devices are known for determining the geographic heading of a body such as a vehicle. Magnetic compasses, which are among the oldest of such devices, find the direction of magnetic north, rather than geographic north, so their readings must be corrected for the local deviation of magnetic north from geographic north. More modern methods and devices include gyrocompasses and methods based on signals received from external transmitters such as the GPS satellite network. Gyrocompassing performance (accuracy and duration) is very sensitive to a gyroscope's drift. The process is very long, usually lasting between 10 minutes and 40 minutes. For high accuracy, a very expensive gyroscope must be used. The methods based on external signals are, by definition, not autonomous.

The object of the present invention is more general than merely finding local north. The object of the present invention is the determination of the full three-dimensional orientation of a body with respect to local geographic coordinates. The local geographic Cartesian coordinate system is the "local level local north" (LLLN) coordinate system, in which the x-axis points towards local north, the y-axis points towards local east and the z-axis points down. The body itself has its own Cartesian coordinate system, referred to herein as the "body coordinate system". For example, a typical Cartesian coordinate system for a vehicle is x-axis= forward, y-axis=right and z-axis=down. The orientation of the body is defined in terms of the Euler angles through which a Cartesian coordinate system, initially aligned with the LLLN coordinate system, must be rotated to align that Cartesian coordinate system with the body coordinate system. These Euler angles are azimuth $\Psi$, pitch $\Theta$ and roll $\Phi$. The rotations that bring the coordinate system, that initially is aligned with the LLLN coordinate system, into alignment with the body coordinate system, are:

1. rotation of the x and y axes by azimuth $\Psi$ about the z-axis;
2. rotation of the x and z axes by pitch $\Theta$ about the intermediate y-axis to bring the x-axis into coincidence with the body x-axis; and
3. rotation about the x-axis by roll $\Phi$ to bring the y and z axes into coincidence with the body y and z axes.

Note that azimuth $\Psi$ also is the angle between geographic north and the projection of the body x-axis in the horizontal (x-y) LLLN plane.

SUMMARY OF THE INVENTION

According to the present invention there is provided a method of determining an orientation of a body, including the steps of: (a) measuring an acceleration of the body in a first direction; (b) measuring an acceleration of the body in a second direction different from the first direction, the first direction and the second direction defining a plane; (c) measuring an acceleration perpendicular to the plane in a coordinate system rotating about an axis perpendicular to the plane; and (d) inferring the orientation of the body from the three measurements.

According to the present invention there is provided a method of determining an azimuth of a body, the azimuth being defined in a certain plane, the method including the steps of: (a) measuring an acceleration, perpendicular to the plane, in a coordinate system rotating about an axis perpendicular to the plane; and (b) inferring the orientation of the body from the measured acceleration.

According to the present invention there is provided an apparatus for determining an orientation of a body, including: (a) a first accelerometer, fixedly mounted with respect to the body, for measuring an acceleration of the body in a first direction; (b) a second accelerometer, fixedly mounted with respect to the body, for measuring an acceleration of the body in a second direction, the first and second directions defining a plane; (c) a third accelerometer for measuring an acceleration in a direction perpendicular to the plane; and (d) a mechanism for revolving the third accelerometer about an axis of revolution perpendicular to the plane.

According to the present invention there is provided an apparatus for determining an azimuth of a body, the azimuth being defined in a certain plane, including: (a) a first accelerometer, for measuring an acceleration perpendicular to the plane; and (b) a mechanism for revolving the first accelerometer about an axis of revolution perpendicular to the plane.

The present invention exploits the fact that the LLLN coordinate system is rotating. Specifically, the LLLN coordinate system rotates, along with the Earth, around the Earth's rotational axis, at a uniform (vectorial) angular velocity $\vec{\Omega}$. This fact is exploited to determine the azimuth angle of a body that is stationary with respect to the Earth. The principle of the present invention, in its most general form, is to measure acceleration in the body z-direction, using an accelerometer that is caused to revolve, at a uniform angular speed, around an axis of revolution, that itself points in the body z-direction, at a fixed distance from the axis of revolution. Because this accelerometer is moving with respect to the Earth, the acceleration measured by this accelerometer includes a Coriolis force component. Meanwhile, the components of the gravitational acceleration of the body in the body x- and y- directions are measured by two other accelerometers. Because the body is stationary with respect to the Earth, the accelerations in the x- and y- directions do not include a Coriolis component. The pitch and roll are inferred from the measured x- and y- accelerations. The azimuth is inferred from the pitch, the roll, and the phase of the time-dependent part of the acceleration in the z-direction. In the special case of zero pitch and zero roll, only the acceleration in the z-direction is measured, and the phase of the time-dependent part of the acceleration in the z-direction is identical to the azimuth.

Preferably, to reduce sensitivity to common mode noise sources such as vibration, two accelerometers, on opposite sides of the axis of revolution, are used to measure the acceleration in the z-direction. The signals of the two accelerometers are subtracted.

The method of the present invention for defining the azimuth is relatively insensitive to common accelerometer errors such as constant bias, scale factor error, and misalignment errors.

Unlike magnetic compasses, the present invention is independent of the Earth's magnetic field. Unlike methods that rely on external transmitters such as GPS satellites, the present invention is fully autonomous. A drawback of the present invention relative to gyrocompasses is that the present invention works only for a stationary body; but bodies oriented using gyrocompasses must themselves be stationary when gyrocompassing is performed.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method and apparatus which can be used to determine the geographic orientation of a body such as a vehicle.

The principles and operation of orientation determination according to the present invention may be better understood with reference to the drawings and the accompanying description.

Figure 1:
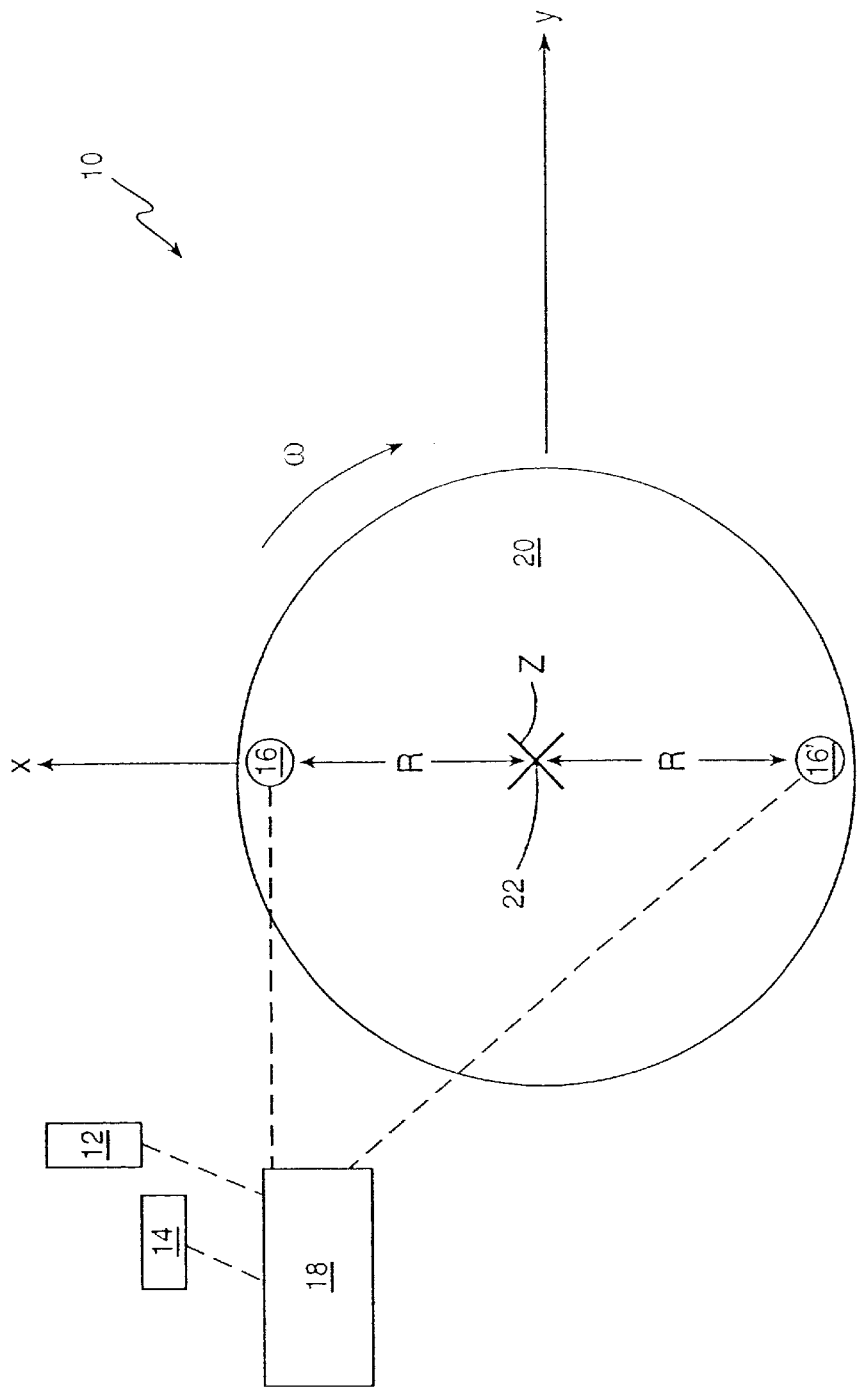
FIG. 1 is a schematic plan view of an apparatus of the present invention.

Referring now to the drawings, FIG. 1 is a schematic plan view of an apparatus 10 of the present invention. Apparatus 10 includes four single-component accelerometers 12, 14, 16 and 16' for measuring acceleration in the directions of the three axes of the body coordinate system. These three axes are shown in FIG. 1 as an x-axis pointing upward in the plane of FIG. 1, a y-axis pointing rightward in the plane of FIG. 1, and a z-axis pointing downward into the plane of FIG. 1. Accelerometer 12 is mounted rigidly with respect to the body, either within the body or on the body, to measure acceleration of the body in the body x-direction. Accelerometer 14 also is mounted rigidly with respect to the body, either within the body or on the body, to measure acceleration of the body in the body y-direction. Although it is not strictly necessary that the components of acceleration in the body x-y plane that are measured by accelerometers 12 and 14 be orthogonal components, it is preferable that these components be mutually orthogonal, as illustrated. Accelerometers 16 and 16' are mounted rigidly on a table 20 that rotates at a constant angular speed ω around an axis of rotation 22 that is coincident with the z-axis. Thus, as table 20 rotates, accelerometers 16 and 16' revolve about axis 22, so that axis 22 also is an axis of revolution for accelerometers 16 and 16'. Accelerometers 16 and 16' are mounted at a radial distance R from axis 22. Accelerometers 16 and 16' measure acceleration in the body z-direction. Signals from accelerometers 12, 14, 16 and 16' are conveyed by conventional data links, represented by dashed lines in FIG. 1, to a conventional microprocessor-based data processing system 18. Data processing system 18 uses the algorithms presented below to infer the Euler angles from these signals.

Figure 2:
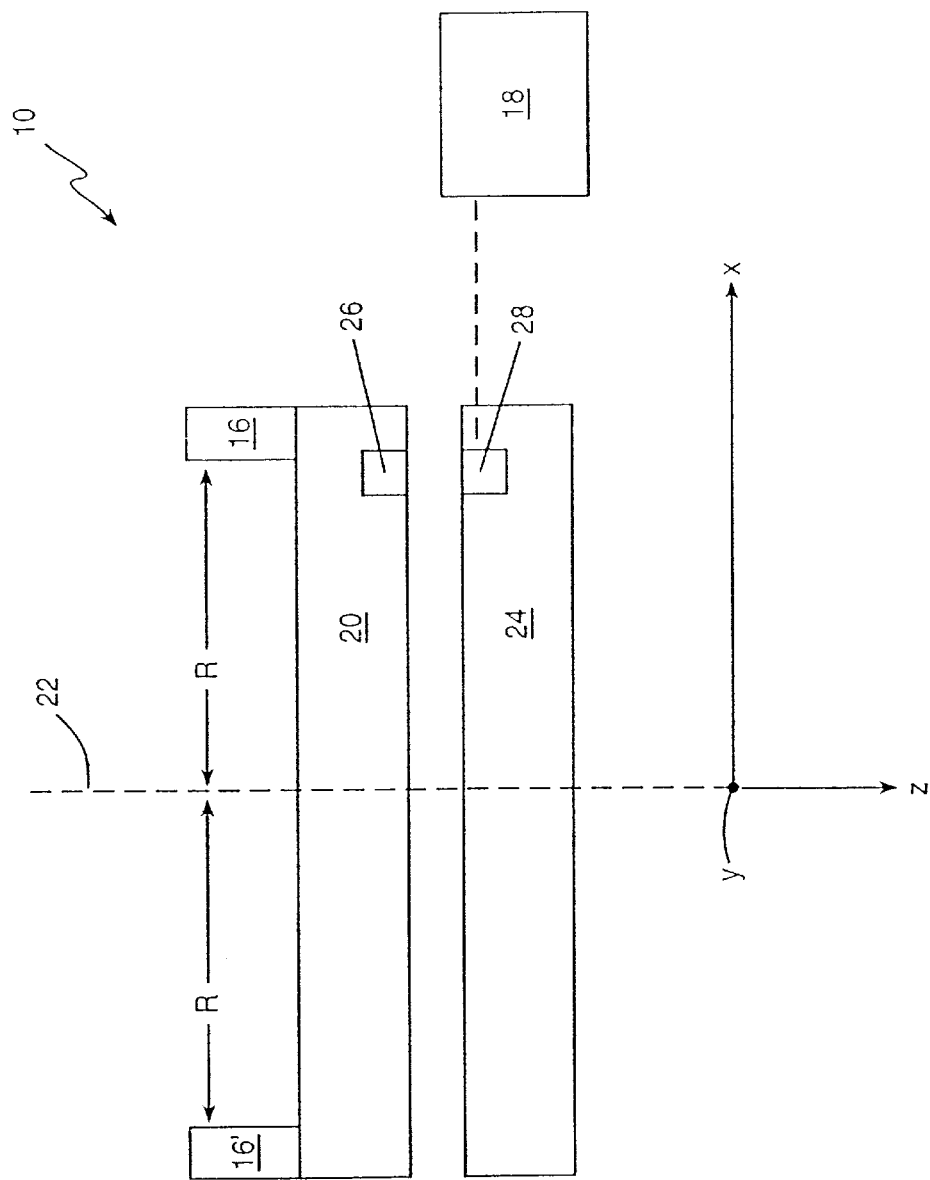
FIG. 2 is a partial schematic side view of the apparatus of FIG. 1.

FIG. 2 is a partial schematic side view of apparatus 10. In FIG. 2, the body x-axis points to the right, the body y-axis points upward out of the plane of the Figure, and the body z-axis points downwards in the plane of the Figure. As in FIG. 1, accelerometers 16 and 16' are shown mounted rigidly on table 20, on opposite sides of axis 22. Table 20 rotates about axis 22 above a platform 24 that is fixedly mounted within the body. On the surface of table 20 that faces platform 24, below accelerometer 16, is mounted a light source 26 such as a LED. On the surface of platform 24 that faces table 20, at distance R from axis 22 in the positive x-direction, is a photodetector 28. Signals from photodetector 28 are conveyed to data processing system 18 by a conventional data link represented in FIG. 2 by a dashed line. Thus, every time accelerometer 16 and LED 26 pass photodetector 28, a synchronization signal is sent to data processing system 18.

The mechanism for rotating table 20 at a constant angular speed is conventional and need not be elaborated here. Suffice it to say that the synchronization signal is used both to control the angular speed of table 20 and to infer the angular positions, as functions of time, of accelerometers 16 and 16'.

For clarity of exposition, the present invention first will be explained on the assumption that the pitch Θ and the roll Φ both are zero. In this case accelerometers 12 and 14 are not needed. For further clarity, only the acceleration measured by accelerometer 16 will be considered initially. Acceleration is measured as a function of time t, starting with accelerometer 16 and LED 26 aligned with photodetector 28 at time t=0. Subsequently, accelerometer 16 and LED 26 are aligned with photodetector 28 at times t=2Nπ/ω, where N is an integer.

In LLLN coordinates, the Earth's angular rotation vector has only two nonzero components: an x (north) component $\Omega_{LN}$ and a z (down) component $\Omega_{LD}$.

Now define a third Cartesian coordinate system, referred to herein as the "table" coordinate system. The body coordinate system and the table coordinate system coincide at time t=0. Subsequently, the table coordinate system rotates with respect to the body coordinate system, about the coincident z-axes of the two coordinate systems, at an angular speed ω. In other words, the table coordinate system is fixed in table 20 and rotates with table 20. In table coordinates, the position vector $\vec{r}$ of accelerometer 16 is a constant:

$$\vec{r} = \begin{pmatrix} R \\ 0 \\ 0 \end{pmatrix} \quad (1)$$

The specific force $\vec{a}$ experienced by body at position $\vec{r}$ in a coordinate system rotating at angular velocity $\vec{\alpha}$ is (Bernard Etkin, *Dynamics of Atmosphere Flight*, John Wiley and Sons, 1972, p. 123 equation 5.1,7):

$$\vec{a} = \vec{F} + \frac{d\vec{\alpha}}{dt} \times \vec{r} + 2\vec{\alpha} \times \frac{d\vec{r}}{dt} + \vec{\alpha} \times (\vec{\alpha} \times \vec{r}) + \frac{d^2\vec{r}}{dt^2}$$

where $\vec{F}$ is the linear acceleration due to external forces on the body. In the present case, all time derivatives of $\vec{r}$ are zero, and $\vec{F}$ is due to gravity.

The transformation from LLLN coordinates to table coordinates is effected by multiplying a vector represented in LLLN coordinates by a direction cosine matrix. Specifically, let $x_L$, $Y_L$ and $Z_L$ be x, y and z coordinates, respectively, in the LLLN coordinate system and let $x_T$, $Y_T$ and $Z_T$ be x, y and z coordinates, respectively, in the table coordinate system. Then:

$$\begin{pmatrix} x_T \\ y_T \\ z_T \end{pmatrix} = \underline{C}_T^L \begin{pmatrix} x_L \\ y_L \\ z_L \end{pmatrix} \qquad (3)$$

where $C_T^L$ is the appropriate direction cosine matrix. With zero pitch $\Theta$ and zero roll $\Phi$, $C_T^L$ is a function only of azimuth $\Psi$, time t and angular speed $\omega$:

$$\underline{C}_T^L = \begin{pmatrix} \cos(\Psi + \omega t) & \sin(\Psi + \omega t) & 0 \\ -\sin(\Psi + \omega t) & \cos(\Psi + \omega t) & 0 \\ 0 & 0 & 1 \end{pmatrix} \qquad (4)$$

Letting $\vec{\Omega}_L$ represent the angular velocity vector of the Earth in LLLN coordinates, $$\vec{\Omega}_L = \begin{pmatrix} \Omega_{LN} \\ 0 \\ \Omega_{LD} \end{pmatrix}$$

it follows that the total angular velocity of accelerometer 16 in table coordinates is $$\vec{\alpha} = \underline{C}_T^L \vec{\Omega}_L + \vec{\omega}$$

where $\vec{\omega}$ is a vector of magnitude $\omega$ pointing in the body (or table) z-direction. The time derivative of $\alpha$ comes exclusively from the time derivative of $C_T^L$:

$$\frac{d\alpha}{dt} = \frac{d\underline{C}_T^L}{dt} \vec{\Omega}_L$$

In LLLN coordinates, the only non-zero component of $\vec{F}$ is the z-component of $\vec{F}$, which is equal to the acceleration due to gravity, g. It follows that in table coordinates, $$\vec{F} = \underline{C}_T^L \begin{pmatrix} 0 \\ 0 \\ g \end{pmatrix}$$

Inserting equations (4) through (8) in equation (2) gives, for the z-component of $\vec{a}$ which is the component of $\vec{a}$ measured by accelerometer 16:

$$a_z = g + A \cos(\omega t + \Psi) \qquad (9)$$

where $A = 2\vec{\omega}\Omega_{LN}R + 2\Omega_{LD}\Omega_{LN}R$ is independent of time. It is evident that the azimuth $\Psi$ is the phase of the time-dependent term of $a_z$.

The preferred method for obtaining $\Psi$ from $a_z$ is to multiply $a_z$ by cos $\omega t$ and by sin $\omega t$ and to integrate these products numerically over one period, t=0 to t=$2\pi/\omega$, of the rotation of table 20. Defining:

$$a_s = \int_0^{2\pi/\omega} a_z \sin\omega t\, dt = -\frac{A}{2}\sin\Psi \qquad (10)$$

and $$a_c = \int_0^{2\pi/\omega} a_z \cos\omega t\, dt = \frac{A}{2}\cos\Psi \qquad (11)$$

it follows that $$\Psi = -arc\,\tan(a_s/a_c) \qquad (12)$$

Because the azimuth $\Psi$ is the phase of the time-dependent term of $a_z$, it is critical that the integrations in equations (10) run from the exact start of one rotational period of table 20 to the exact end of that rotational period. Successive synchronization signals from photodetector 28 to data processing system 18 define successive starts and ends of periods of integration.

As noted above, for common mode rejection, it is preferable to measure $a_z$ using two accelerometers 16 and 16'. The value of $a_z$ measured by accelerometer 16 is given by equation (9) above. Because accelerometer 16' is 180° away from accelerometer 16 on table 20, the value of $a_z$ measured by accelerometer 16' is:

$$a_z = g - A\cos(\omega t + \Psi) \qquad (13)$$

Subtracting the two signals from accelerometers 16 and 16' before integrating as in equations (10) and (11) provides values of $a_s$ and $a_c$ that are relatively immune to common mode noises such as vibrations.

In the general case of non-zero pitch $\Theta$ and roll $\Phi$, the signals $a_x$ and $a_y$ from accelerometers 12 and 14 respectively are due exclusively to gravity:

$$a_x = -g\sin\Theta \qquad (14)$$

$$a_y = g\cos\Theta\sin\Phi \qquad (15)$$

It follows that:

$$\Theta = arc\,\sin(a_x/g) \qquad (16)$$

and $$\Phi = arc\,\sin(a_y/g\cos\Theta) \qquad (17)$$

The acceleration measured by accelerometer 16 is:

$$a_z = g\cos\Theta\cos\Phi + A\cos(\omega t + \beta) \qquad (18)$$

where $$A = 2\omega\Omega_{BX}R + 2\Omega_{BZ}\Omega_{BX}R \qquad (19)$$

and $\beta$ is the angle between the body coordinates x-axis and the projection of the Earth's angular rotation velocity vector $\vec{\Omega}$ in the body x-y plane. In equation (19), $\Omega_{BX}$ is the x-component of $\vec{\Omega}$ in body coordinates:

$$\Omega_{BX} = \cos\Theta\cos\psi\Omega_{LN} - \sin\Theta\Omega_{LD} \qquad (20)$$

and $\Omega_{BZ}$ is the z-component of $\vec{\Omega}$ in body coordinates:

$$\Omega_{BZ} = \cos\Phi\sin\Theta\cos\Psi\Omega_{LN} + \sin\Phi\sin\Psi\Omega_{LN} + \cos\Phi\cos\Theta\Omega_{LD} \qquad (21)$$

It also will be necessary shortly to have the y-component of $\vec{\Omega}$ in body coordinates, $\Omega_{BY}$:

$$\Omega_{BY} = \sin\Phi\sin\Theta\cos\Psi\Omega_{LN} - \cos\Phi\sin\Psi\Omega_{LN} + \sin\Phi\cos\Theta\Omega_{LD} \qquad (22)$$

Numerical manipulation of $a_z$ as described above in equations (10)–(12) yields $\beta$ in the general case instead of $\Psi$.

To obtain $\Psi$ from $\Theta$, $\Phi$ and $\beta$, consider the rotation of the body coordinates about the z-axis that would be necessary to bring the projection of $\vec{\Omega}$ onto the body x-y plane into coincidence with the new body x-axis. The y-component of the projection of $\vec{\Omega}$ onto the body x-y plane in this rotated body coordinate system would be identically zero. It follows that $$\Omega_{BX} \sin \beta + \Omega_{BY} \cos \beta = 0 \qquad (23)$$

Combining equations (20), (22) and (23) gives:

$$B \cos \Psi + C \sin \Psi + D = 0 \qquad (24)$$

where:

$$B = \sin \beta \cos \Theta + \cos \beta \sin \Phi \sin \Theta \qquad (25)$$

$$C = -\cos \beta \cos \Phi \qquad (26)$$

and $$D = (\Omega_{LD}/\Omega_{LN})[\cos \beta \sin \Phi \cos \Theta - \sin \beta \sin \Theta] \qquad (27)$$

Note that $\Omega_{LD}/\Omega_{LN}$ is the negative arctangent of the geographic latitude of the body. Using the following trigonometric identities:

$$\cos \Psi = \frac{1 - \tan^2(\Psi/2)}{1 + \tan^2(\Psi/2)} \qquad (28)$$

$$\sin \Psi = \frac{2 \tan(\Psi/2)}{1 + \tan^2(\Psi/2)} \qquad (29)$$

gives the following quadratic equation for $\tan(\Psi/2)$:

$$(D-B)\tan^2(\Psi/2) + 2C \tan(\Psi/2) + B + D = 0 \qquad (30)$$

whose solution is $$\tan(\Psi/2) = \frac{-C \pm \sqrt{B^2 + C^2 - D^2}}{D - B} \qquad (31)$$

In the most usual practical case of $|\Theta| < 30°$ and $|\Phi| < 30°$, the sign ambiguity in equation (31) is resolved by selecting the value of $\Psi$ which is closer to $\beta$.

While the invention has been described with respect to a limited number of embodiments, it will be appreciated that many variations, modifications and other applications of the invention may be made.

What is claimed is:

1. A method of determining an orientation of a body, comprising the steps of:
   (a) measuring an acceleration of the body in a first direction;
   (b) measuring an acceleration of the body in a second direction different from said first direction, said first direction and said second direction defining a plane;
   (c) measuring an acceleration perpendicular to said plane in a coordinate system rotating about an axis perpendicular to said plane; and
   (d) inferring the orientation of the body from said three measurements.

2. The method of claim 1, wherein said first and second directions are mutually perpendicular.

3. The method of claim 1, wherein said measuring of acceleration in said first and second directions is effected using two accelerometers mounted rigidly with respect to the body.

4. The method of claim 1, wherein said rotating coordinate system rotates at a uniform angular speed with respect to the body.

5. The method of claim 1, wherein said measuring of said acceleration in said rotating coordinate system is effected by steps including:
   (i) mounting a first accelerometer at a fixed distance from said axis; and
   (ii) revolving said first accelerometer about said axis.

6. The method of claim 5, wherein said measuring of said acceleration in said rotating coordinate system is effected by steps further including:
   (iii) mounting a second accelerometer at said fixed distance from said axis; and
   (iv) revolving said second accelerometer about said axis along with said first accelerometer.

7. The method of claim 6, wherein said first and second accelerometers are mounted on opposite sides of said axis.

8. The method of claim 1, wherein said measuring of said acceleration in said rotating coordinate system is effected at a plurality of times.

9. The method of claim 8, wherein said inferring is based on a phase of a time-dependent component of said acceleration in said rotating coordinate system.

10. A method of determining an azimuth of a body, the azimuth being defined in a certain plane, the method comprising the steps of:
    (a) measuring an acceleration, perpendicular to the plane, in a coordinate system rotating about an axis perpendicular to the plane; and
    (b) inferring the orientation of the body from said measured acceleration.

11. The method of claim 10, wherein said rotating coordinate system rotates at a uniform angular speed with respect to the body.

12. The method of claim 10, wherein said measuring of said acceleration is effected by steps including:
    (i) mounting a first accelerometer at a fixed distance from said axis; and
    (ii) revolving said first accelerometer about said axis.

13. The method of claim 12, wherein said measuring of said acceleration is effected by steps further including:
    (iii) mounting a second accelerometer at said fixed distance from said axis; and
    (iv) revolving said second accelerometer about said axis along with said first accelerometer.

14. The method of claim 13, wherein said first and second accelerometers are mounted on opposite sides of said axis.

15. The method of claim 10, wherein said measuring of said acceleration is effected at a plurality of times.

16. The method of claim 15, wherein said inferring is based on a phase of a time-dependent component of said acceleration.

17. An apparatus for determining an orientation of a body, comprising:
    (a) a first accelerometer, fixedly mounted with respect to the body, for measuring an acceleration of the body in a first direction;
    (b) a second accelerometer, fixedly mounted with respect to the body, for measuring an acceleration of the body in a second direction, said first and second directions defining a plane;
    (c) a third accelerometer for measuring an acceleration in a direction perpendicular to said plane; and
    (d) a mechanism for revolving said third accelerometer about an axis of revolution perpendicular to said plane.

18. The apparatus of claim 17, wherein said first and second directions are mutually perpendicular.

19. The apparatus of claim 17, further comprising:
   (e) a computational mechanism for receiving signals from said accelerometers and inferring the orientation from said signals.

20. The apparatus of claim 17, further comprising:
   (e) a fourth accelerometer for measuring an acceleration in said direction perpendicular to said plane, said mechanism revolving both said third accelerometer and said fourth accelerometer together about said axis.

21. The apparatus of claim 20, wherein said third and fourth accelerometers are mounted on said mechanism on opposite sides of said axis.

22. An apparatus for determining an azimuth of a body, the azimuth being defined in a certain plane, comprising:
   (a) a first accelerometer, for measuring an acceleration perpendicular to the plane; and
   (b) a mechanism for revolving said first accelerometer about an axis of revolution perpendicular to the plane.

23. The apparatus of claim 22, further comprising:
   (c) a computational mechanism for receiving signals from said accelerometer and inferring the azimuth from said signals.

24. The apparatus of claim 22, further comprising:
   (c) a second accelerometer for measuring an acceleration in said direction perpendicular to the plane, said mechanism revolving both said third accelerometer and said fourth accelerometer together about said axis of revolution.

25. The apparatus of claim 24, wherein said first and second accelerometers are mounted on said mechanism on opposite sides of said axis.

* * * * *